United States Patent
Aghamohammadi et al.

(10) Patent No.: US 10,613,546 B2
(45) Date of Patent: Apr. 7, 2020

(54) STOCHASTIC MAP-AWARE STEREO VISION SENSOR MODEL

(71) Applicant: QUALCOMM Incorporated, San Diego, CA (US)

(72) Inventors: Aliakbar Aghamohammadi, San Diego, CA (US); Saurav Agarwal, College Station, TX (US); Shayegan Omidshafiei, Boston, MA (US); Kiran SomaSundaram, San Diego, CA (US); Christopher Lott, San Diego, CA (US); Bardia Fallah Behabadi, La Jolla, CA (US); Sarah Paige Gibson, Del Mar, CA (US); Casimir Matthew Wierzynski, La Jolla, CA (US); Gerhard Reitmayr, Vienna (AT); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 15/192,603

(22) Filed: Jun. 24, 2016

(65) Prior Publication Data
US 2017/0161910 A1   Jun. 8, 2017

Related U.S. Application Data

(60) Provisional application No. 62/262,339, filed on Dec. 2, 2015.

(51) Int. Cl.
*G05D 1/02* (2020.01)
*G06K 9/62* (2006.01)
(Continued)

(52) U.S. Cl.
CPC ......... *G05D 1/0274* (2013.01); *G05D 1/0251* (2013.01); *G06K 9/00664* (2013.01);
(Continued)

(58) Field of Classification Search
CPC . G05D 1/0088; G05D 1/0274; G06K 9/00791
See application file for complete search history.

(56) References Cited

U.S. PATENT DOCUMENTS

| 7,302,456 B2 | 11/2007 | Ueda et al. |
| 9,092,698 B2 | 7/2015 | Buehler et al. |

(Continued)

OTHER PUBLICATIONS

Thrun, Sebastian. "Learning occupancy grid maps with forward sensor models." Autonomous robots 15.2 (2003): 111-127.*

(Continued)

*Primary Examiner* — Vincent Rudolph
*Assistant Examiner* — Raphael Schwartz
(74) *Attorney, Agent, or Firm* — Seyfarth Shaw LLP

(57) ABSTRACT

A method for defining a sensor model includes determining a probability of obtaining a measurement from multiple potential causes in a field of view of a sensor modeled based on a stochastic map. The stochastic map includes a mean occupancy level for each voxel in the stochastic map and a variance of the mean occupancy level for each pixel. The method also includes determining a probability of obtaining an image based on the determined probability of obtaining the measurement. The method further includes planning an action for a robot, comprising the sensor, based on the probability of obtaining the image.

20 Claims, 10 Drawing Sheets

(51) Int. Cl.
  *G06K 9/00* (2006.01)
  *G06T 7/579* (2017.01)
(52) U.S. Cl.
  CPC ............ *G06K 9/6277* (2013.01); *G06T 7/579* (2017.01); *G06T 2207/10021* (2013.01); *G06T 2207/20076* (2013.01); *G06T 2207/30252* (2013.01)

(56) References Cited

U.S. PATENT DOCUMENTS

| | | | |
|---|---|---|---|
| 9,189,751 | B2 | 11/2015 | Matsuoka et al. |
| 2006/0178828 | A1 | 8/2006 | Moravec |
| 2014/0122409 | A1 | 5/2014 | Na et al. |
| 2014/0350839 | A1* | 11/2014 | Pack ................ G01C 21/30 701/409 |
| 2015/0339589 | A1 | 11/2015 | Fisher |
| 2017/0157769 | A1 | 6/2017 | Aghamohammadi et al. |
| 2017/0161946 | A1 | 6/2017 | Aghamohammadi et al. |

OTHER PUBLICATIONS

Ryde, Julian, and Huosheng Hu. "3D mapping with multi-resolution occupied voxel lists." Autonomous Robots 28.2 (2010): 169.*

Callaghan, S. O., and F. Ramos. "A bayesian approach to occupancy mapping with uncertain inputs." IEEE Int. Conf. on Robotics and Automation. 2010. (Year: 2010).*

Styler, Alex, Statistical Techniques in Robotics, Sep. 12, 2012, Carnegie Mellon University, http://www.cs.cmu.edu/~16831-f12/notes/F12/16831_lecture05_vh.pdf (Year: 2012).*

Elfes A., "Using Occupancy Grids for Mobile Robot Perception and Navigation", Computer, IEEE, US, vol. 22, No. 6, Jun. 1, 1989, XP011436714, pp. 46-57.

Franco J-S., et al., "Fusion of Multi-View Silhouette Cues Using a Space Occupancy Grid", Computer Vision, ICCV 2005, Tenth IEEE International Conference on Beijing, China, Oct. 17-20, 2005, Piscataway, NJ, USA, IEEE, Los Alamitos, CA, USA, vol. 2, Oct. 17, 2005, XP010857024, pp. 1747-1753.

International Search Report and Written Opinion—PCT/US2016/061400—ISA/EPO—dated Jan. 31, 2017-01-31.

Murray D., et al., "Using Real-Time Stereo for Mobile Robot Navigation", Autonomous Robots, Kluwer Academic Publishers, Dordrecht, NL, vol. 8, No. 2, Apr. 1, 2000, XP002387346, pp. 161-171.

Thrun S., "Learning Occupancy Grid Maps with Forward Sensor Models", Autonomous Robots, Boston, Sep. 1, 2003, XP055335484, pp. 111-127. Retrieved from the Internet: URL:http://faculty.iiit.ac.In/-mkrishna/ThrunOccGrid.pdf.

* cited by examiner

STOCHASTIC MAP-AWARE STEREO VISION SENSOR MODEL

CROSS REFERENCE TO RELATED APPLICATION

This application claims the benefit under 35 U.S.C. § 119(e) to U.S. Provisional Patent Application No. 62/262,339, entitled "STOCHASTIC MAP AWARE STEREO VISION SENSOR MODEL," filed on Dec. 2, 2015, the disclosure of which is expressly incorporated herein by reference in its entirety.

BACKGROUND

Field

Aspects of the present disclosure generally relate to machine learning and, more particularly, to improving systems and methods of defining a sensor model based on a stochastic map.

Background

In some cases, it is desirable to determine a position of an autonomous vehicle, such as a robot, within a given area. In other cases, given the position of the robot, it is desirable to generate a map of the robot's surroundings. Maps may be generated via an incremental approach or a batch approach. A map generated via the batch approach may be generated at once after multiple sensor measurements have been gathered throughout an environment to be mapped. That is, in the batch approach, all of the data of an environment to be mapped is gathered before calculating the map. Still, in some cases, a robot may not be able to gather all of the data in an environment prior to calculating the map.

Thus, in some cases, an incremental approach is specified for generating a map. A map generated via the incremental approach may be calculated based on initial data collected from the vicinity of the robot and updated with each new sensor measurement. Each new sensor measurement may be based on the robot changing its location, measuring a different area from the same location, or performing the same measurement for redundancy. For the incremental approach, the sensor measurements are independent from each other. Therefore, the robot may use assumptions when calculating the map. Thus, there may be some uncertainty when calculating an incremental map.

A map with uncertainty based on the assumptions may be referred to as a stochastic map. When generating the map and/or planning a trajectory through a mapped environment, a sensor model may be defined to predict an occupancy level of voxels in a sensor's field of view given the map having multiple voxels with various occupancy levels and confidence values in the occupancy levels.

SUMMARY

In one aspect of the present disclosure, a method of defining a sensor model is disclosed. The method includes determining a probability of obtaining a measurement from multiple potential causes in a field of view of a sensor modeled based on a stochastic map. The map has a mean occupancy level for each voxel in the map and a variance of the mean occupancy level for each voxel. The method also includes determining a probability of obtaining an image based on the determined probability of obtaining the measurement. The method further includes planning an action for a robot, including the sensor, based on the probability of obtaining the image.

Another aspect of the present disclosure is directed to an apparatus including means for determining a probability of obtaining a measurement from multiple potential causes in a field of view of a sensor modeled based on a stochastic map. The map includes a mean occupancy level for each voxel in the map and a variance of the mean occupancy level for each voxel. The apparatus also includes means for determining a probability of obtaining an image based on the determined probability of obtaining the measurement. The apparatus further includes means for planning an action for a robot, comprising the sensor, based on the probability of obtaining the image.

In another aspect of the present disclosure, a non-transitory computer-readable medium with non-transitory program code recorded thereon is disclosed. The program code for defining a sensor model is executed by a processor and includes program code to determine a probability of obtaining a measurement from multiple potential causes in a field of view of a sensor modeled based on a stochastic map. The map comprises a mean occupancy level for each voxel in the map and a variance of the mean occupancy level for each voxel. The program code also includes program code to determine a probability of obtaining an image based on the determined probability of obtaining the measurement. The program code further includes program code to plan an action for a robot, including the sensor, based on the probability of obtaining the image.

Another aspect of the present disclosure is directed to an apparatus for defining a sensor model having a memory unit and one or more processors coupled to the memory unit. The processor(s) is configured to determine a probability of obtaining a measurement from multiple potential causes in a field of view of a sensor modeled based on a stochastic map. The map has a mean occupancy level for each voxel in the map and a variance of the mean occupancy level for each voxel. The processor(s) is also configured to determine a probability of obtaining an image based on the determined probability of obtaining the measurement. The processor(s) is further configured to plan an action for a robot, including the sensor, based on the probability of obtaining the image.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
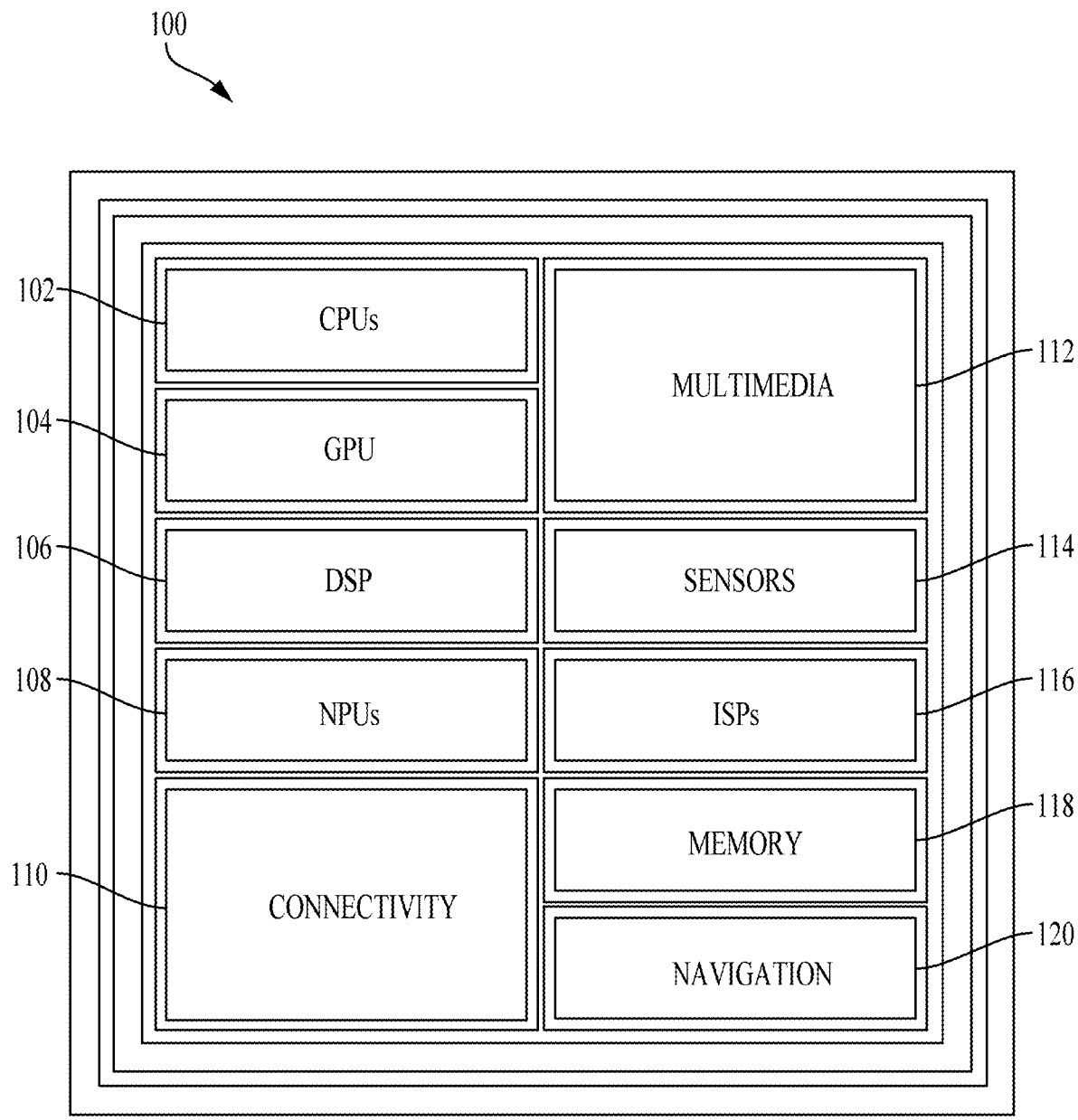
FIG. 1 illustrates an example implementation of motion planning with a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

For autonomous systems, such as robots, it is desirable to construct an accurate map of the robot's surroundings. The map may be generated via a sensor, such as a stereo vision sensor. Furthermore, when constructing maps for large environments, voxel sizes are increased to keep the computation tractable.

In one configuration, to determine a map, the map may be partitioned into voxels (e.g., cells). Each voxel may have a state of being occupied (e.g., full), partially occupied, or empty. When generating a map using the incremental approach (e.g., incremental data), conventional techniques may calculate inconsistent maps, may not account for the uncertainty in a determined occupancy level of a voxel, and/or may not determine the occupancy level (e.g., full, partially full, or empty) of voxels. For example, in conventional systems, when calculating a map using the incremental approach, a voxel is either zero (e.g., empty) or one (e.g., full). Thus, conventional systems do not consider the occupancy level of a voxel when calculating a map. In the present application, occupancy level may refer to the ratio of an occupancy over a space. Furthermore, occupancy level may also be referred to as occupancy and/or density.

Aspects of the present disclosure are directed to defining a sensor model based on a stochastic map having a mean occupancy level for each voxel and a variance for each mean occupancy level. The sensor model may be implemented on chip (e.g., on a digital signal processor (DSP) or graphics processing unit (GPU)). The sensor model may be useful, for example, in robotics applications and where there is variance in the knowledge about the environment in which the robot will operate.

FIG. 1 illustrates an example implementation of the aforementioned sensor model using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation 120, which may include a global positioning system.

The SOC may be based on an ARM instruction set. In an aspect of the present disclosure, the instructions loaded into the general-purpose processor 102 may comprise code for determining a probability of obtaining a measurement from multiple potential causes in a field of view of a sensor being modeled based on a stochastic map comprising a mean occupancy level for each voxel in the stochastic map and a variance of the mean occupancy level. The general-purpose processor 102 may also comprise code for determining a probability of obtaining an image based on the determined probability of obtaining the measurement. Furthermore, the general-purpose processor 102 may further comprise code for planning an action for a robot comprising the sensor 114 based on the probability of obtaining the image.

Figure 2:
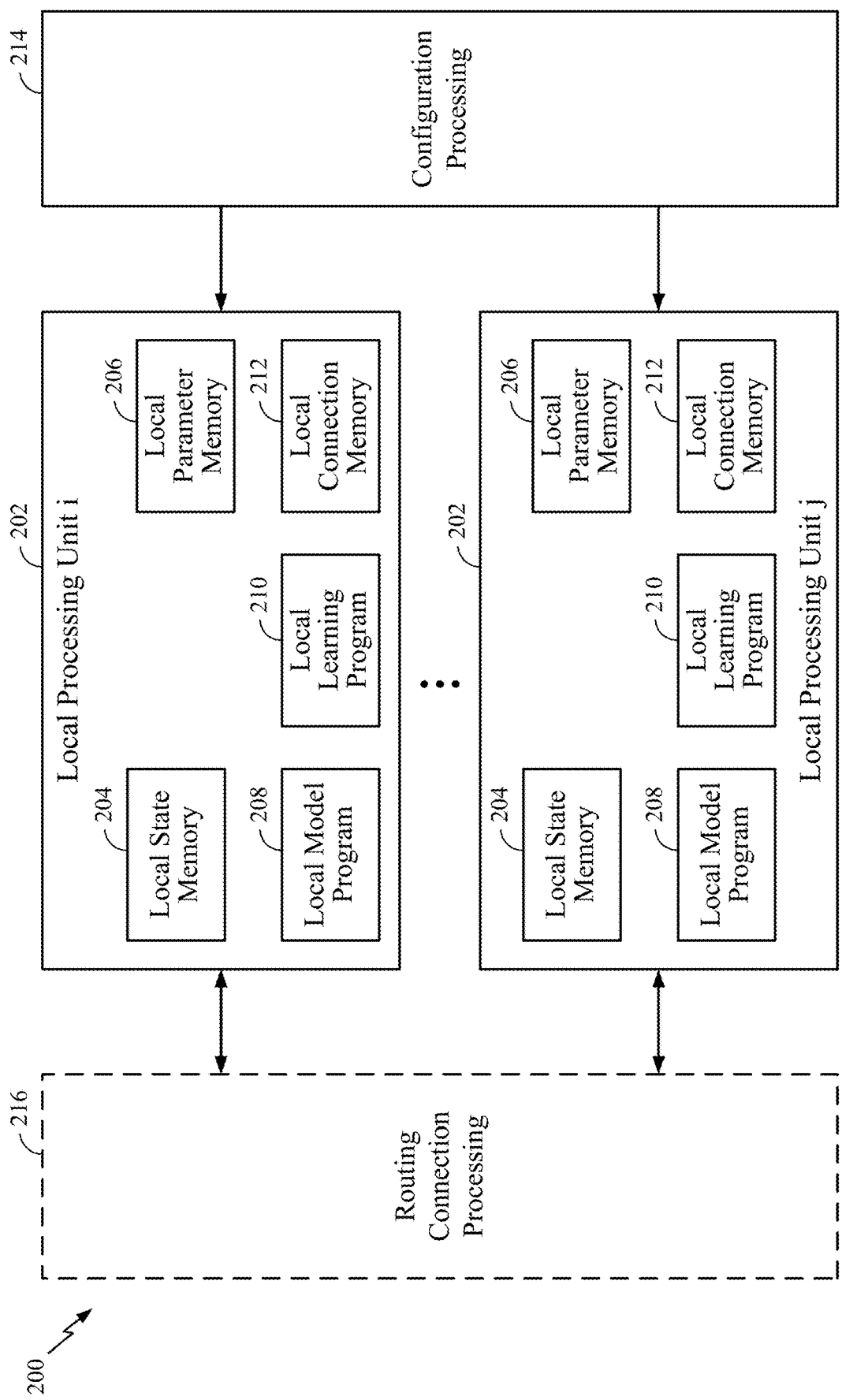
FIG. 2 illustrates an example implementation of a system in accordance with certain aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

In one configuration, a map generating model is configured for determining an occupancy level of each voxel of a plurality of voxels, determining a PDF of the occupancy level, and performing an incremental Bayesian update on the PDF to generate the map based on a measurement performed after determining the PDF. The model includes a determining means and/or a performing means. In one aspect, the determining means and/or the performing means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Stochastic Map Aware Stereo Vision Sensor Model

As previously discussed, aspects of the present disclosure are directed to determining an occupancy level of each voxel and determining a confidence level of a determined occupancy level. The confidence level may be referred to as a probability distribution function (PDF) of a voxel given data observed by a device, such as a robot (e.g., autonomous device). A confidence level of a map may be based on the confidence level of each of the voxels in the map.

In one configuration, a mapping module is specified for a device, such as a robot. The mapping module may be a digital signal processor (DSP), app-processor, graphics processing unit (GPU), and/or another module. The mapping module may be specified to improve the accuracy of maps generated using incremental data. Furthermore, the mapping module may process the occupancy level of voxels (e.g., enable large voxels and reduce computational complexity), and/or incorporate a sensor model, such as a stochastic sensor model, in map construction. Additionally, the mapping module may process the occupancy levels of voxels in a map and determine the confidence level of the determined occupancy. Finally, the mapping module may be used for improving planning under uncertainty. Aspects of the present disclosure are directed to generating a map for a robot. Still, the maps are not limited to being generated for a robot and are contemplated for any type of device, such as, for example a car, airplane, boat, and/or human. Furthermore, in one configuration, the device is autonomous.

Figure 3A:
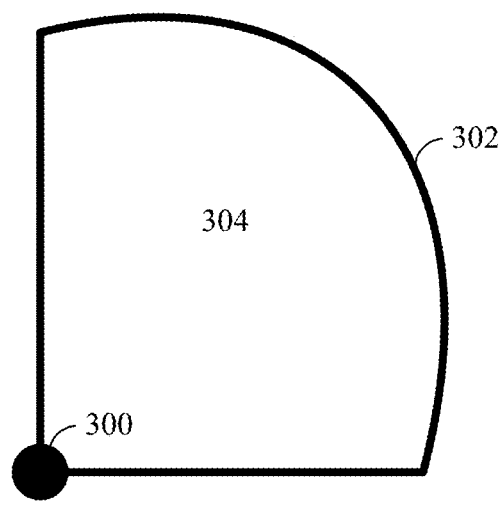
FIGS. 3A, 3B, and 3C illustrate examples of a robot performing measurements according to aspects of the present disclosure.
Figure 3B:
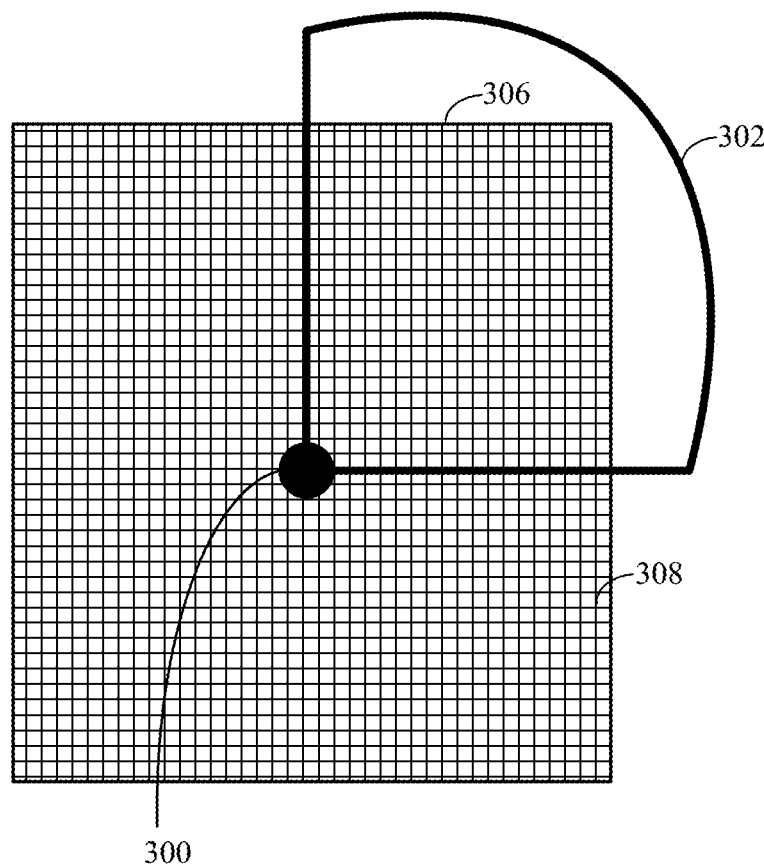
Figure 3C:
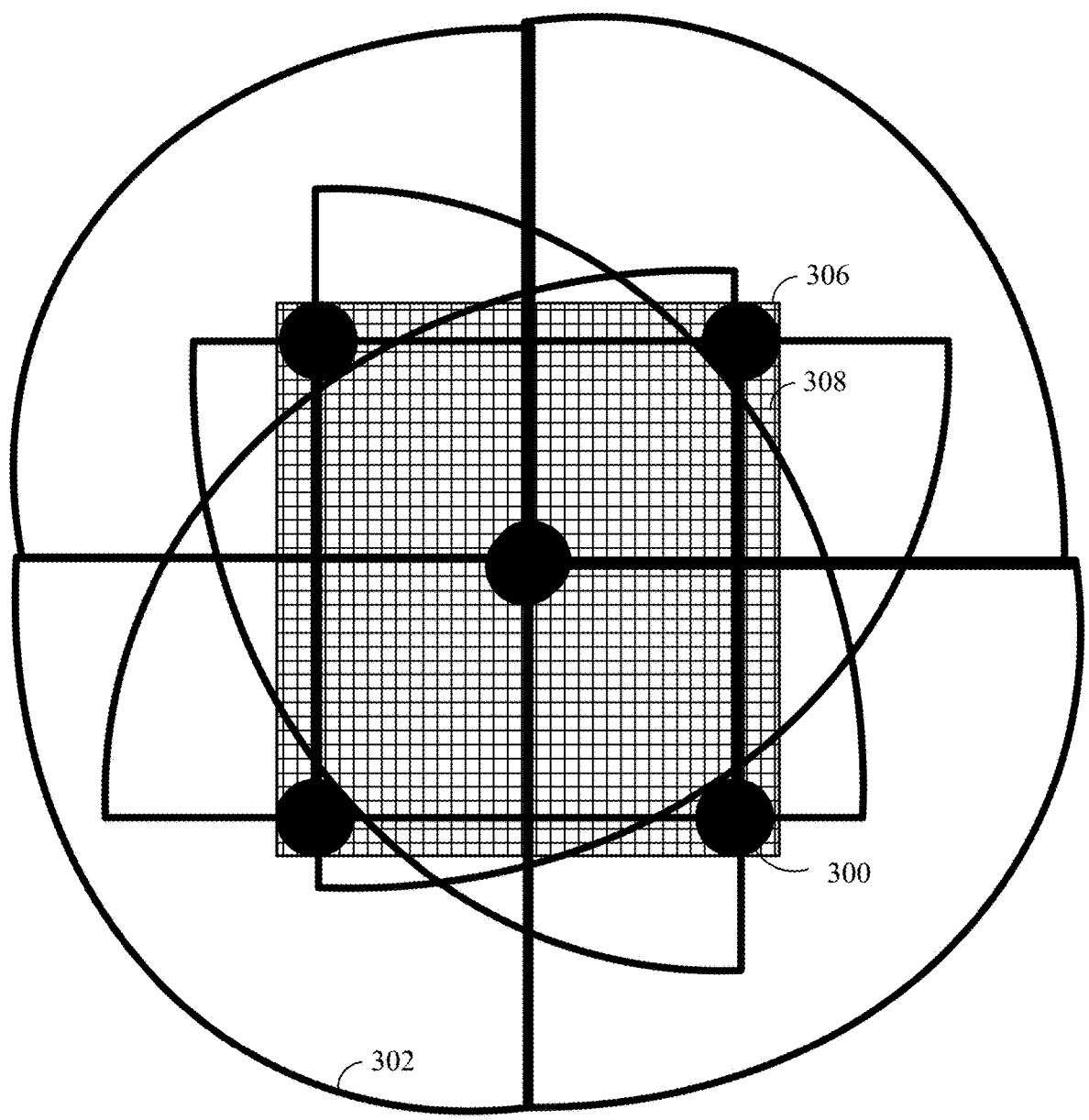

FIGS. 3A, 3B, and 3C illustrate examples of a robot performing measurements according to aspects of the present disclosure. FIG. 3A illustrates an example of a robot 300 performing measurements via one or more sensors (not shown) of the robot 300. Measurements may refer to a measurement obtained based on whether a ray is intercepted by a voxel. Of course, aspects of the present disclosure are not limited to measurement rays and are also contemplated for other types of measurements. As shown in FIG. 3A, the sensor of the robot 300 may have a measurement cone 302 such that the sensor receives measurements from an area 304 within the cone 302.

As shown in FIG. 3B, according to an aspect of the present disclosure, the robot 300 may be placed in an environment to be mapped 306. The environment to be mapped 306 may include multiple voxels 308. As shown in FIG. 3B, based on the measurements by the sensor, the sensor may determine an occupancy level of each voxel 308 within the measurement cone 302. It should be noted that the voxels 308 of FIG. 3B are for illustrative purposes, the voxels of the present disclosure are not limited to the size or number of voxels shown in FIG. 3B.

As shown in FIG. 3C, according to an aspect of the present disclosure, the robot 300 may perform measurements at different locations. For an incremental approach, the map is generated based on measurements obtained at a first location and the generated map is updated as the robot moves to different locations in the environment to be mapped 306. The measurements at different locations are performed at different times (e.g., different time steps). For example, a robot 300 may perform a first measurement at a first location at a first time and a second measurement at a second location at a second time.

Figure 4:
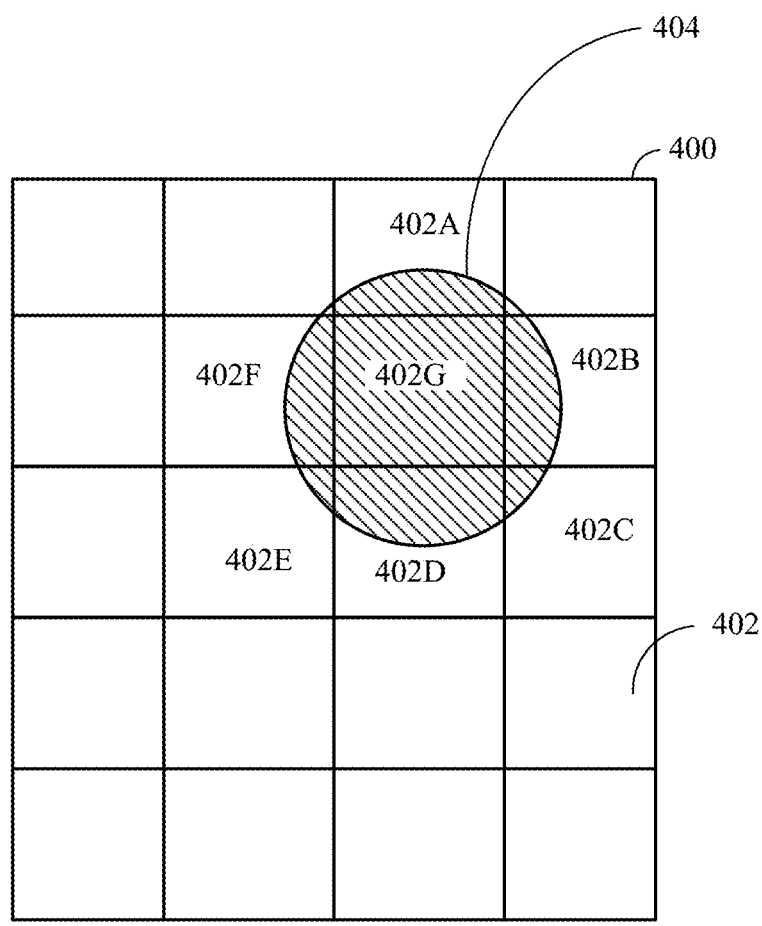
FIG. 4 illustrates an example of an environment to be mapped according to aspects of the present disclosure.

FIG. 4 illustrates an example of an environment to be mapped 400 according to aspects of the present disclosure. As shown in FIG. 4, a robot (not shown) may create a grid of the environment to be mapped 400. The grid forms multiple voxels 402. Furthermore, in this example, an object 404 is within the environment to be mapped 400. Thus, as shown in FIG. 4, some of the voxels 402 are empty, some of the voxels 402A-402F are partially occupied, and one voxel 402G is fully occupied.

As shown in FIGS. 3B, 3C, and 4, an environment to be mapped may be represented as a grid. Each cell in the grid may be referred to as a voxel. Furthermore, as previously discussed, each voxel has an occupancy level. The occupancy level may be referred to as the occupancy and/or the density. The occupancy level (d) may be a variable, such as a random variable, with a mean and a variance.

The mean of the occupancy level may be calculated from:

$$\hat{d} = E[d|z_{o:k}] \quad (1)$$

The variance of the occupancy level may be calculated from:

$$\sigma^d = Var[d|z_{o:k}] \quad (2)$$

The mean and variance are determined from all of the obtained measurements ($z_{0:k}$). In conventional systems, uncertainty is not specified for the measurements of voxels. For example, in conventional systems, if the reported occupancy level (e.g., cell posterior) is 0.5, a route planner may not determine if the 0.5 resulted from a few measurements or hundreds of measurements. Thus, the reliability of the occupancy level is unknown. Therefore, conventional systems may result in inconsistent maps due to inaccurate assumptions.

After determining an occupancy level, such as a mean occupancy level, of each voxel of multiple voxels, it is desirable to determine a confidence level (e.g., probability) of the determined occupancy level. For example, if multiple measurements have indicated that a voxel is occupied, there is a high probability that the voxel is occupied in comparison to a situation where only one measurement has indicated that a voxel is occupied. Furthermore, if an occupancy level of a voxel has a low confidence level (e.g., a confidence level below a threshold), the robot may move to various locations to take additional measurements to improve the confidence in the occupancy level.

In one configuration, an update rule is specified to determine the probability (p) of an occupancy level (d) of a map (m). The probability (p) may be referred to as a probability distribution function (PDF) that includes the mean and variance (e.g., confidence of the occupancy level). In one configuration, the mean and variance may be extracted from the PDF of the occupancy level of a voxel. Furthermore, a route may be planned based on the mean and variance. The planning of the route and the extracting may be performed as described in U.S. provisional patent application No. 62/262,275 filed on Dec. 2, 2015, in the names of AGHA-MOHAMMADI et al., the disclosure of which is expressly incorporated by reference herein in its entirety.

The probability may be determined based on EQUATION 1. In one configuration, the probability is approximated using lower order functions:

$$p(d \mid z_{0:k}) = \frac{p(z_k \mid d) p(d \mid z_{0:k-1})}{p(z_k \mid z_{0:k-1})} \quad (3)$$

In EQUATION 3, $z_{0:k}$ are the measurements collected by the sensor from time step 0 to time step k. That is, EQUATION 3 recursively determines the probability of the occupancy level (d) at time step k given the sensor measurements from time step 0 to time step k ($z_{0:k}$). The occupancy level (d) is for the whole map. That is, d is the collection of all voxels in the map $d^1$ to $d^g$, where g is the number of voxels in the map. In EQUATION 3, $p(z_k|d)$ is the likelihood of obtaining a measurement (z) at time step k given the occupancy level (d) of all voxels in the map. Furthermore, in EQUATION 1, $p(d|z_{0:k-1})$ is the previously calculated occupancy level (d) of a map at time step k given the sensor measurements from time step 0 to time step k−1 ($z_{0:k-1}$).

Figure 5A:
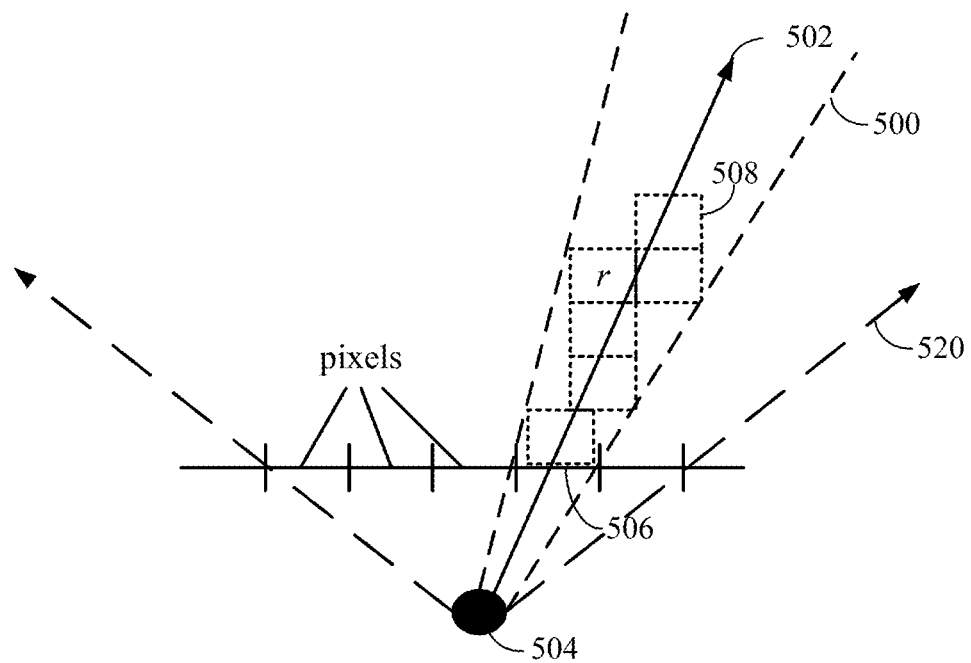
FIGS. 5A, 5B, 5C, 5D, and 6 illustrate examples of performing measurements according to aspects of the present disclosure.

Given an occupancy level and probability of the occupancy level, it is desirable to define a sensor model to predict what a sensor may see at a given location. That is, in one configuration, the robot may infer a presence of an object in an environment based on the determined probability of obtaining the image. FIG. 5A illustrates an example of a measurement cone 500 for one pixel 506 of multiple pixels, according to an aspect of the present disclosure. A sensor 504, such as a stereoscopic camera, includes multiple pixels 506 within the field of view 520 of the sensor 504. Aspects of the present disclosure are directed to determining a cause of a ray bouncing back from one of the voxels 508 within a measurement cone 500 for each pixel 506 of multiple pixels within the entire field of view 520 of the sensor 504.

As shown in FIG. 5A, a measurement ray 502 is generated from a center of a sensor (x) 504 and sent through a pixel location (v) 506. Furthermore, as shown in FIG. 5A, multiple voxels (r) 508 may fall within the measurement cone 500 of the measurement ray 502. The measurement cone 500 corresponds to one pixel of an image. The center of a sensor (x) 504 may also correspond to a location of the robot.

The ray 502 may be defined based on the sensor (x) and the pixel location (v), that is the ray 502 may be defined by the variable xv. When a measurement is taken, the ray 502 is emitted and may be reflected back to the sensor 504 to provide a disparity observation (z), or measurement, at time step (t). Using the disparity measurement, a depth or distance to an object in the environment may be inferred. In one configuration, there is a one-to-one correspondence between disparity and depth.

Figure 5B:
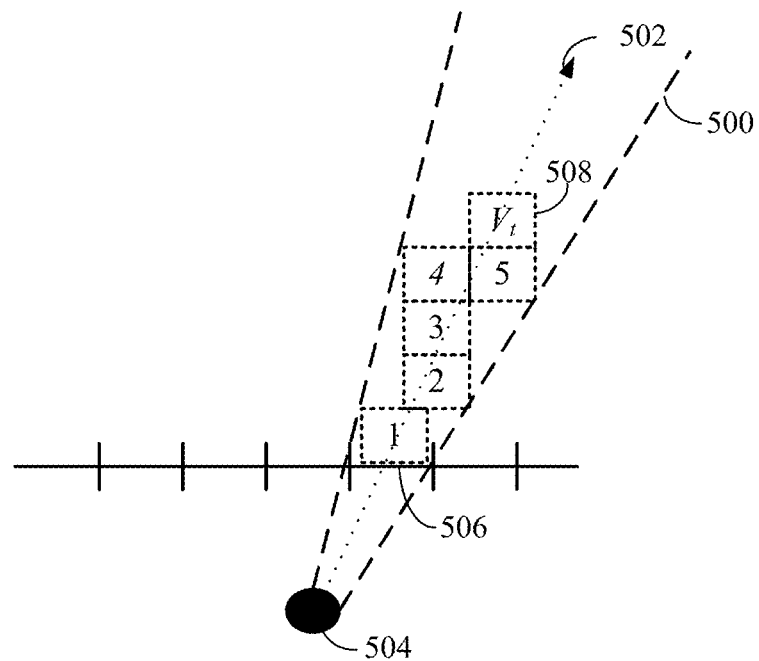

A cause variable ($c_t$) may be defined to represent the measurement cause (c) at time step (t). The cause variable may be referred to as a correspondence variable. The cause (c) corresponds to a voxel (r) that caused the ray to bounce back (e.g., the voxel that triggered the measurement). In one configuration, the cause variable is defined as $c_t \in \{c_t^{-1}, c_t^0, c_t^1, c_t^2, c_t^{V_t}\}$. The cause variable includes voxels 1 to Vt as causes ordered by distance to the camera ($c_t^1, c_t^1, \ldots, c_t^{V_t}$), where voxel 1 is the closest to the camera and voxel Vt is the farthest from the camera. FIG. 5B illustrates an example of indexing voxels (r) in a measurement cone 500 with a voxel number. The indexing of the voxel numbers is local to the measurement cone 500. In one configuration, when the ray bounces back from a voxel, the voxel that caused the ray to bounce back is indicated in the cause variable. For example, based on FIG. 5B, if voxel 3 was the cause of the ray 502 bouncing back, the cause variable would be $c_t^3$, where t is the time step of the measurement.

Additionally, the cause variable includes a variable $c_t^{-1}$, where r is −1, to account for the case of a spurious measurement. A spurious measurement may occur when the sensor's temperature is above a threshold. In another example, the sensor may obtain a spurious measurement indicating that a certain voxel is occupied when in fact the voxel is empty. Furthermore, the cause variable includes a variable for when there is no measurement $c_t^0$, where r is zero. The variable $c_t^0$ accounts for the case when an obstacle is not located in any of the voxels. That is, when the ray does not bounce back, the cause variable is $c_t^0$.

Figure 5C:
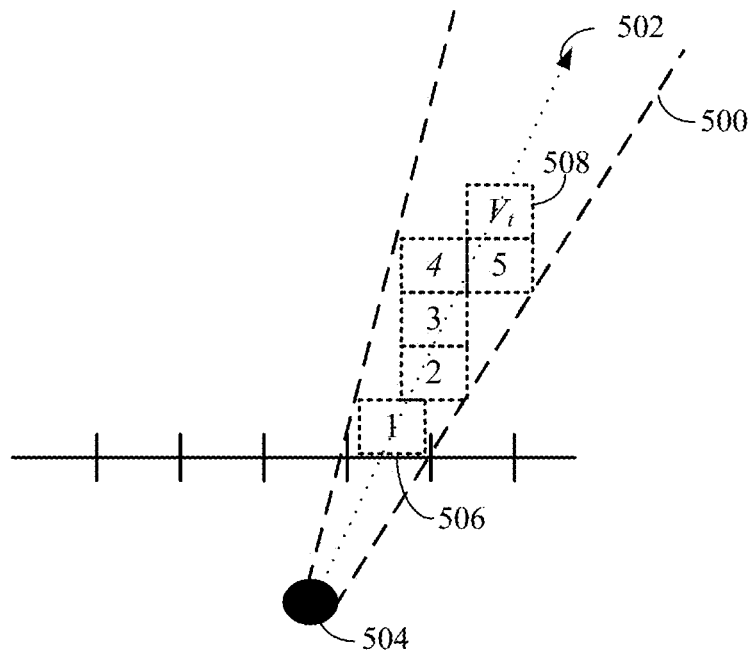
Figure 5D:
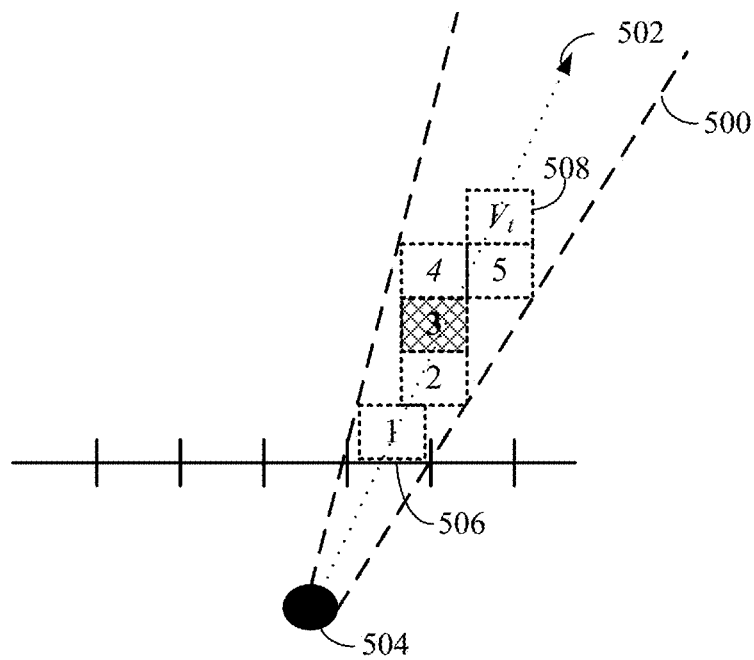

FIGS. 5C and 5D illustrate examples of the measurement ray 502 according to aspects of the present disclosure. As shown in FIG. 5C, the measurement ray 502 may be transmitted from a sensor 504 through a pixel 506 in a direction (e.g., xv) towards multiple voxels 508. In this example, the measurement ray passes through multiple voxels 508 (voxel one-voxel $V_t$) and there are no objects between the sensor 504 and the last voxel $V_t$. Therefore, the measurement ray 502 does not bounce back to the sensor 504. Thus, in the example of FIG. 5C, the cause is $c_t^0$.

In another example, as shown in FIG. 5D, a measurement ray 502 may be transmitted from a sensor 504 through a pixel 506 in a direction (e.g., xv) towards multiple voxels 508. In this example, there is an object in voxel three of the multiple voxels 508 (voxel one-voxel $V_t$) such that the object fully occupies voxel three. Therefore, voxel three is the cause of the measurement ray 502 bouncing back (e.g., reflecting back) to the sensor 504. Thus, in the example of FIG. 5D, the cause is $c_t^3$.

As shown in FIGS. 5B-5D, the voxels (r) in a measurement cone may be indexed by a voxel number. Still, the voxel number used to index a specific voxel from multiple voxels in a measurement cone may be different from the voxel number used to index the specific voxel from multiple voxels in the entire map. That is, a local measurement cone index number for a voxel is different from a global map index number of the voxel. As an example, a voxel may have a local measurement cone index number of four and a global map index number of fifty. In one configuration, a global map index number (j) may be determined as follows:

$$j = g(xv, r) \quad (4)$$

where j is the global map index number that is derived using a function go, which returns the global map index number j given a ray xv and a local measurement cone index number r. Furthermore, the global map index number may be used to determine the density of a map (m) at the corresponding global map index number j. Specifically, the density of a map (m) at the voxel corresponding to global map index number j, may be determined by:

$$m_t^j = m_t^{g(xv,r)} \quad (5)$$

In EQUATION 5, the density of map (m) at the global map index number for voxel (j) is derived using a function go which returns the global map index number j given a ray xv and a local measurement cone index number r. Furthermore, a sensor model may be defined as:

$$p(z_t|m_t, xv_t) = \Sigma_{r=-1}^{V_t} p(z_t|c_t = c_t^r, m_t, xv_t) Pr(c_t = c_t^r | m_t, xv_t) \quad (6)$$

where xvt is the ray at time step t, and mt is a map of the density of a voxel under a ray xvt. The sensor model is the likelihood (e.g., confidence) (p) of obtaining a disparity measurement ($z_t$) given a ray ($xv_t$) of the map ($m_t$) (e.g., a belief of what the environment looks like). As shown in EQUATION 6, the sensor model may be expressed as the sum, for all cause variables $\{c_t^{-1}, c_t^0, c_t^1, c_t^2, \ldots, c_t^{v_t}\}$, of the products of the likelihood of a measurement for a given cause ($p(z_t|c_t=c_t^r, m_t xv_t)$) and the probability of the given cause ($Pr(c_t=c_t^r|m_t, xv_t)$). That is, the likelihood of a measurement for a given cause ($p(z_t|c_t=c_t^r, m_t xv_t)$) and the probability of the given cause ($Pr(c_t=c_t^r|m_t, xv_t)$) may be combined to determine the probability of obtaining the measurement and/or to define the sensor model In EQUATION 6, the likelihood of a measurement for a given cause ($p(z_t|c_t=c_t^r, m_t xv_t)$) is the likelihood (e.g., confidence) (p) of obtaining a disparity measurement ($z_t$) given a cause $c_t^r$ at a map $m_t$ with a ray $xv_t$ at time step t. Furthermore, the probability of the given cause (Pr ($c_t=c_t^r|m_t, xv_t$)) is the probability (pr) of obtaining a measurement by a cause $c_t^r$ at a map $m_t$ with a ray $xv_t$ at time step t. For the cause being $c_t^{-1}$, the probability of the given cause is determined by $P_{rand}$, which is a constant. $P_{rand}$ may be based on a sensor datasheet or statistical measurements. For the cause being $c_0^3$, the probability of the given cause is determined by $(1-p_{rand})\Pi_{r=1}^{V_t}(1-m_t^{g(x,v,r)})$. Finally, for the cause being $c_t^k$, where k is a local voxel index ($1-V_t$) that caused the ray to bounce back, the probability of the given cause is determined by $(1-p_{rand})m_t^{g(x,v,r)}\Pi_{r=1}^{k-1}(1-m_t^{g(x,v,r)})$.

A likelihood of a measurement given a particular cause and a probability of the given cause may be calculated as discussed above. The likelihood of a measurement may be repeated for all causes. The resulting measurement likelihoods may be combined to generate a sensor model for a stochastic map. The sensor model is for a particular pixel. Thus, the sensor model for the multiple pixels may be combined to determine a likelihood of obtaining an image (D). The likelihood of obtaining an image (D) may be determined as follows:

$$p(D_t|m_t, xv_t) = \Pi_{v=1}^{Npix} p(D_t|m_t, xv_t) = \Pi_{v=1}^{Npix} \Sigma_{r=-1}^{V_t} p(z_t|c_t = c_t^r, m_t, xv_t) Pr(c_t = c_t^r | m_t, xv_t) \quad (7)$$

where the likelihood of obtaining an image (D) at time step t given a ray ($xv_t$) of the map ($m_t$) is the product of the sensor models for a first pixel to an $N^{th}$ pixel ($N_{pix}$). Furthermore, as previously discussed, the robot may infer a presence of an object in an environment based on the determined probability of obtaining the image. The inferring may be used to plan a trajectory and/or to obtain additional measurements.

Figure 6:
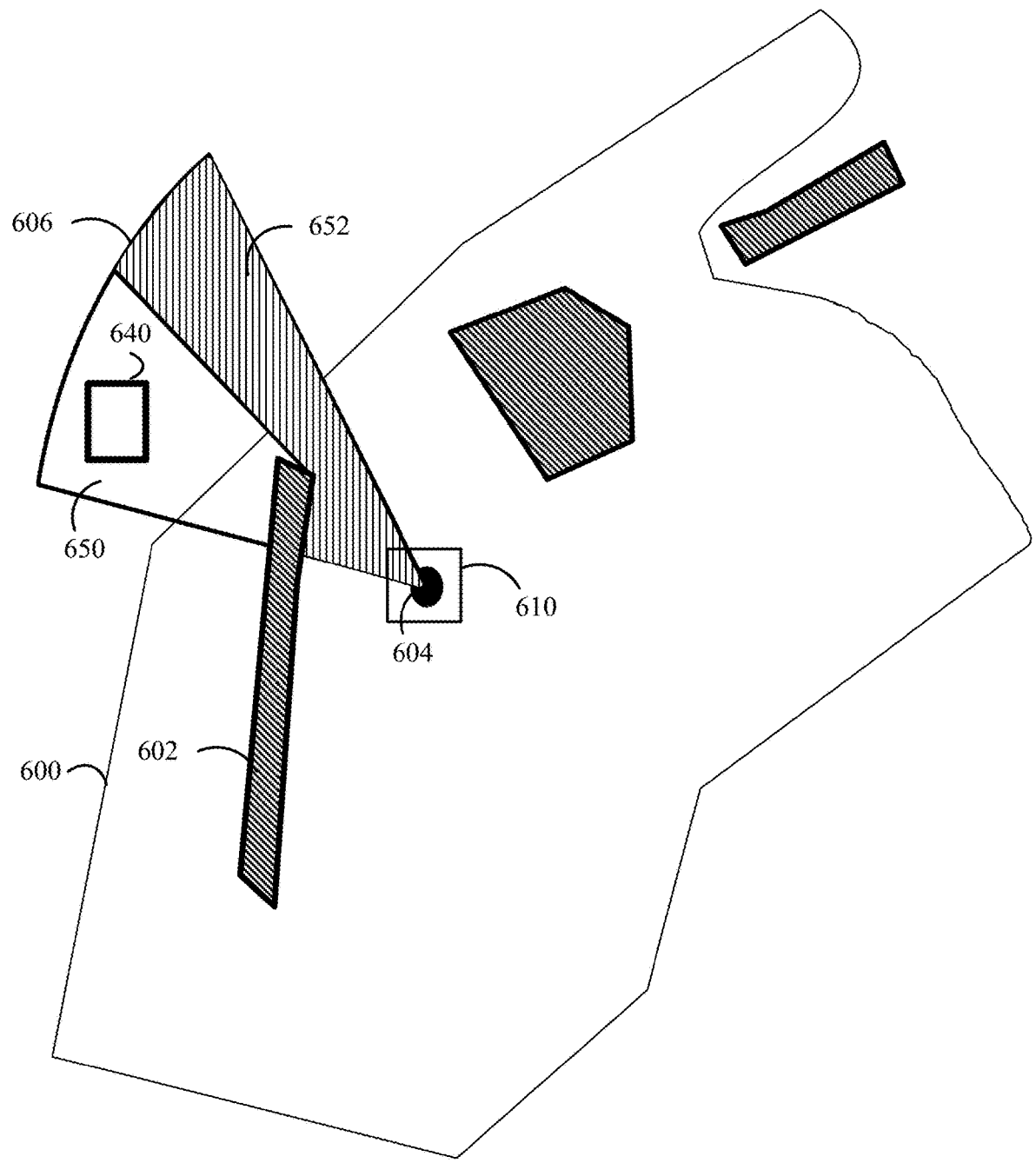

FIG. 6 illustrates an example of a robot 604 in an area 600 that has been mapped. Although the area 600 has been mapped, there may be some uncertainty in the occupancy level of each voxel of the mapped area 600. For example, the robot may have only performed one measurement on the voxel. As another example, noise data received from the robot sensors may not be fully reliable. For example, noisy interference picked up by robot sensors may mislead a robot into determining a space is occupied when it is actually free. Therefore, there may be a variance in the measurements of the voxels.

Furthermore, as shown in FIG. 6, the robot 604 has a field of view 606 for a sensor on the robot. As discussed above, the robot's sensor includes multiple pixels and aspects of the present disclosure are directed to determining the probability of obtaining a measurement from each pixel of the multiple pixels. Furthermore, aspects of the present disclosure are directed to determining the probability of obtaining an image (D) based on the probability of obtaining a measurement from each of the multiple pixels.

In a conventional system, a mapped area does not have uncertainty. Therefore, if a robot 604 were placed in a location 610 to plan a path to a target 640, or obtain measurements of a target 640, the robot would know that an object 602 would be in a field of view 606 of the sensor. Thus, in the conventional system, the robot 604 would know that robot may only view objects in a first portion 652 of the field of view 606 due to the presence of an object 602 blocking the robot from obtaining measurements from a second portion 650 of the field of view.

Still, as previously discussed, aspects of the present disclosure are directed to a stochastic map with uncertainty for the occupancy levels of voxels. Thus, in one configuration, when the robot 604 is placed in a location 610, the sensor model determines the likelihood of obtaining a measurement, or an image, of a target 640. As previously discussed, the likelihood of obtaining a measurement is based on the sum, for all cause variables $\{c_t^{-1}, c_t^0, c_t^1, c_t^2, \ldots, c_t^{v_t}\}$, of the products of the likelihood of a measurement for a given cause ($p(z_t|c_t=c_t^r, m_t xv_t)$) and the probability of the given cause ($Pr(c_t=c_t^r|m_t, xv_t)$). Furthermore, as discussed above, the likelihood of obtaining an image (D) at time step t given a ray ($xv_t$) of the map ($m_t$) is the product of the sensor models for a first pixel to an $N^{th}$ pixel (Npix). Based on the likelihood of obtaining an image (D), a subsequent action may be determined for the robot. The action may include planning a route to reach a target or specifying additional measurements to increase the likelihood of obtaining an image (D). The route may be planned as described in U.S. provisional patent application No. 62/262,275 filed on Dec. 2, 2015, in the names of AGHA-MOHAMMADI et al., the disclosure of which is expressly incorporated by reference herein in its entirety.

Figure 7:
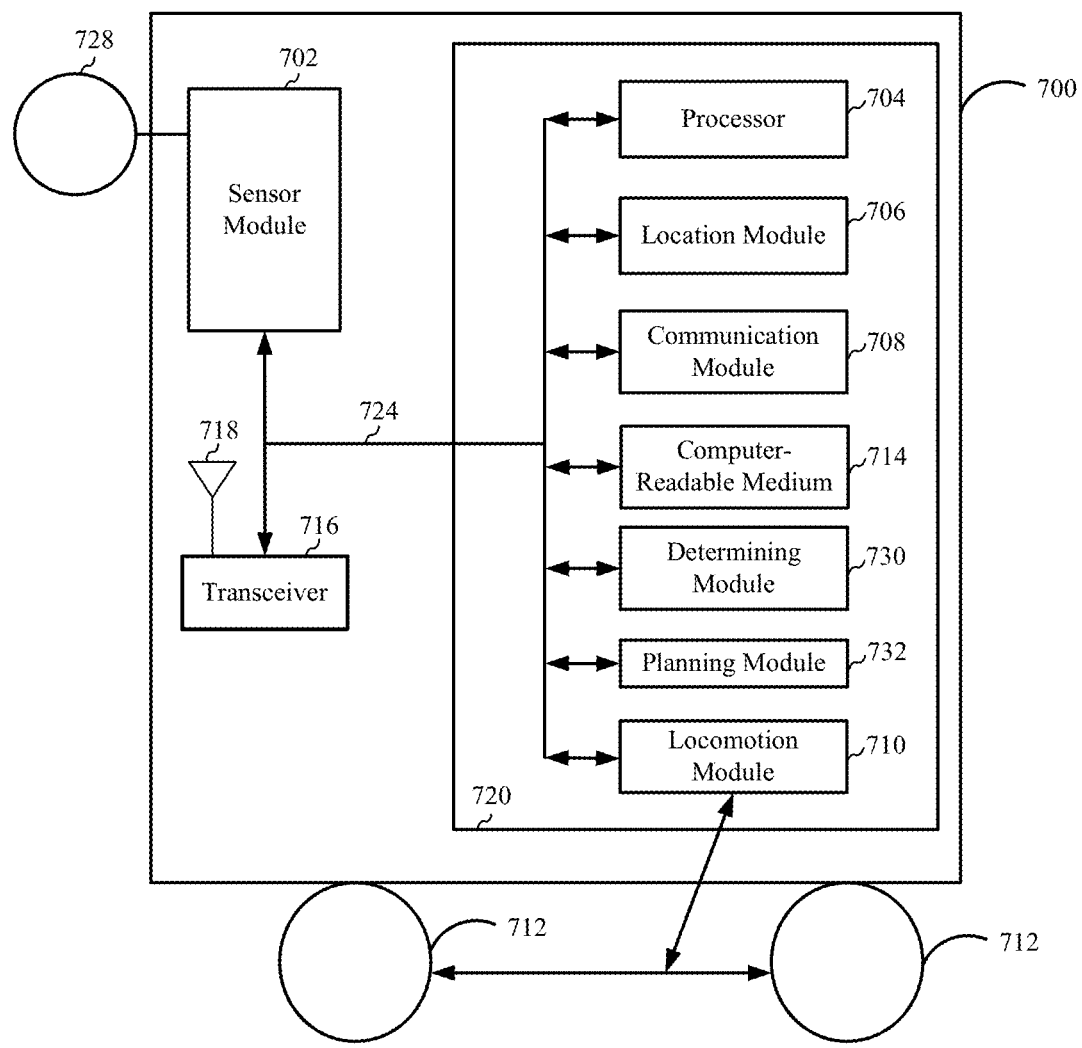
FIG. 7 is a block diagram illustrating different modules/means/components in an exemplary apparatus.

FIG. 7 is a diagram illustrating an example of a hardware implementation for an apparatus 700, such as a robot, employing a processing system 720. The processing system 720 may be implemented with a bus architecture, represented generally by the bus 724. The bus 724 may include any number of interconnecting buses and bridges depending on the specific application of the processing system 720 and the overall design constraints. The bus 724 links together various circuits including one or more processors and/or hardware modules, represented by the processor 704 the communication module 708, location module 706, sensor module 702, locomotion module 710, the computer-readable medium 714, and other modules 730 732. The bus 724 may also link various other circuits such as timing sources, peripherals, voltage regulators, and power management circuits, which are well known in the art, and therefore, will not be described any further.

The apparatus 700 includes a processing system 720 coupled to a transceiver 716. The transceiver 716 is coupled to one or more antennas 718. The transceiver 716 enables communicating with various other apparatus over a transmission medium. The processing system 720 includes a processor 704 coupled to a computer-readable medium 714. The processor 704 is responsible for general processing, including the execution of software stored on the computer-readable medium 714. The software, when executed by the processor 704, causes the processing system 720 to perform the various functions described for any particular apparatus. The computer-readable medium 714 may also be used for storing data that is manipulated by the processor 704 when executing software.

The sensor module 702 may be used to obtain measurements via a sensor 728. The sensor 728 may be a stereo vision sensor, for performing measurements, such as a stereoscopic camera. Of course, aspects of the present disclosure are not limited to a stereo vision sensor as other types of sensors, such as, for example, radar, thermal, sonar, and/or lasers are also contemplated for performing measurements. The measurements of the sensor 728 may be processed by one or more of the processor 704 the communication module 708, location module 706, locomotion module 710, and the computer-readable medium 714. Furthermore, the measurements of the sensor 728 may be transmitted to an external device by the transceiver 716. The sensor 728 is not limited to being defined external to the apparatus 700, as shown in FIG. 7, the sensor 728 may also be defined within the apparatus 700.

The location module 706 may be used to determine a location of the apparatus 700. The location module 706 may use GPS or other protocols for determining the location of the apparatus 700. The communication module 708 may use the transceiver 716 to send and receive information, such as the location of the apparatus 700, to an external device. The locomotion module 710 may be used to provide locomotion to the apparatus 700. As an example, locomotion may be provided via wheels 712. Of course, aspects of the present disclosure are not limited to providing locomotion via wheels 712 and are contemplated for any other type of component for providing location.

The processing system 720 includes a determining module 730 for determining a probability of obtaining a measurement from multiple potential causes in a field of view of a sensor being modeled on a stochastic map. The map comprises a mean occupancy level for each voxel in the map and a variance of the mean occupancy level for each voxel. The determining module may also determine a probability of obtaining an image based on the determined probability of obtaining the measurement. The processing system 720 also includes a planning module 732 for planning an action for a robot based on the probability of obtaining the image. The modules may be software modules running in the processor 704, resident/stored in the computer-readable medium 714, one or more hardware modules coupled to the processor 704, or some combination thereof.

Figure 8:
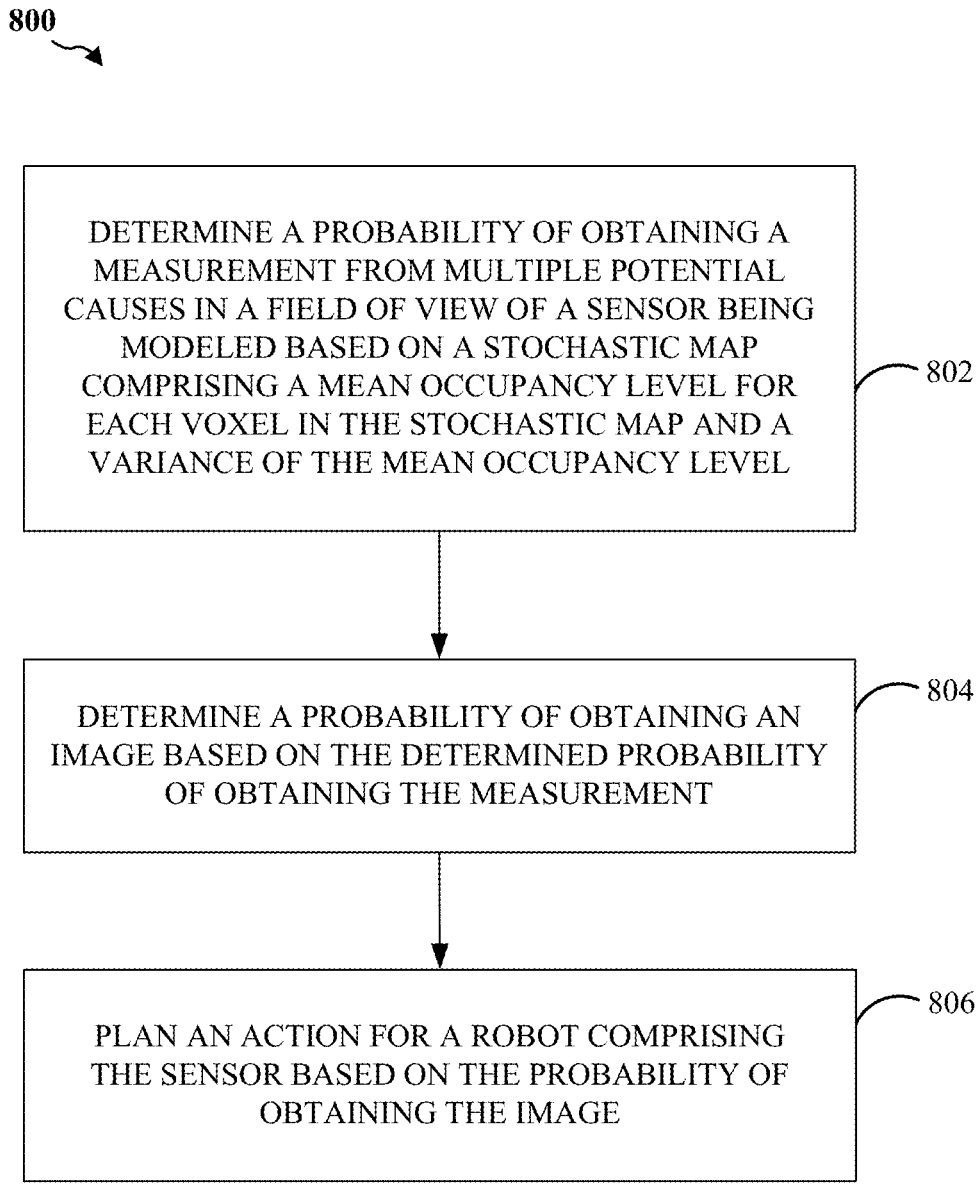
FIG. 8 illustrates a flow diagram for a method of defining a sensor model according to aspects of the present disclosure.

FIG. 8 illustrates a method 800 for generating a map. In block 802, the robot determines a probability of obtaining a measurement from multiple potential causes in a field of view of a sensor modeled based on a stochastic map. The map includes a mean occupancy level for each voxel in the map and a variance of the mean occupancy level for each voxel. Furthermore, in block 804, the system determines a probability of obtaining an image based on the determined probability of obtaining the measurement. Finally, in block 806, the robot plans an action based on the probability of obtaining the image.

In some aspects, method 800 may be performed by the SOC 100 (FIG. 1) or the system 200 (FIG. 2). That is, each of the elements of method 800 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of defining a sensor model, comprising:
determining a probability of obtaining a measurement from a plurality of potential causes in a field of view of a sensor calculating a grid-based stochastic map of an environment, the grid-based stochastic map comprising a mean occupancy level for each voxel in the grid-based stochastic map and a variance of the mean occupancy level for each voxel, an occupancy level indicating whether a voxel is full, partially full, or empty, and each voxel corresponding to a cell in a grid of the grid-based stochastic map;
determining a probability of obtaining an image of an intended target of a robot at a current location of the robot based on the determined probability of obtaining the measurement;
updating the mean occupancy level and the variance for voxels in the field of view based on the probability of obtaining the measurement;
planning an action for the robot based on the probability of obtaining the image; and
navigating, the robot, through the environment based on the planned action.

2. The method of claim 1, in which determining the probability of obtaining the measurement further comprises, for each potential cause of the plurality of potential causes:
calculating a likelihood of the measurement given the cause;
determining a probability of the potential cause in the grid-based stochastic map; and
combining measurement likelihoods for the plurality of potential causes and a probability of the plurality of potential causes:
to determine the probability of obtaining the measurement, and
to define the sensor model.

3. The method of claim 1, further comprising inferring a presence of the intended target in the environment based on the determined probability of obtaining the image.

4. The method of claim 1, in which the field of view is for one pixel of a plurality of pixels from an entire field of view of the sensor.

5. The method of claim 1, in which the planned action comprises:
a path to the intended target when the probability of obtaining the image is greater than a threshold; and
additional measurements at a new location when the probability of obtaining the image is less than the threshold.

6. An apparatus for defining a sensor model, the apparatus comprising:
means for determining a probability of obtaining a measurement from a plurality of potential causes in a field of view of a sensor calculating a grid-based stochastic map of an environment, the grid-based stochastic map comprising a mean occupancy level for each voxel in the grid-based stochastic map and a variance of the mean occupancy level for each voxel, an occupancy level indicating whether a voxel is full, partially full, or empty, and each voxel corresponding to a cell in a grid of the grid-based stochastic map;
means for determining a probability of obtaining an image of an intended target of a robot at a current location of the robot based on the determined probability of obtaining the measurement;
means for updating the mean occupancy level and the variance for voxels in the field of view based on the probability of obtaining the measurement;
means for planning an action for the robot based on the probability of obtaining the image; and
means for navigating, the robot, through the environment based on the planned action.

7. The apparatus of claim 6, in which the sensor comprises a stereoscopic camera.

8. The apparatus of claim 6, in which the means for determining the probability of obtaining the measurement further comprises, for each potential cause of the plurality of potential causes:
means for calculating a likelihood of the measurement given the cause;
means for determining a probability of the potential cause in the grid-based stochastic map; and means for combining measurement likelihoods for the plurality of potential causes and a probability of the plurality of potential causes:
- to determine the probability of obtaining the measurement, and
- to define the sensor model.

9. The apparatus of claim 6, further comprising means for inferring a presence of the intended target in the environment based on the determined probability of obtaining the image.

10. The apparatus of claim 6, in which the field of view is for one pixel of a plurality of pixels from an entire field of view of the sensor.

11. An apparatus for defining a sensor model, the apparatus comprising:
a memory; and
at least one processor coupled to the memory, the at least one processor configured:
- to determine a probability of obtaining a measurement from a plurality of potential causes in a field of view of a sensor calculating a grid-based stochastic map of an environment, the grid-based stochastic map comprising a mean occupancy level for each voxel in the grid-based stochastic map and a variance of the mean occupancy level for each voxel, an occupancy level indicating whether a voxel is full, partially full, or empty, and each voxel corresponding to a cell in a grid of the grid-based stochastic map;
- to determine a probability of obtaining an image of an intended target of a robot at a current location of the robot based on the determined probability of obtaining the measurement;
- to update the mean occupancy level and the variance for voxels in the field of view based on the probability of obtaining the measurement;
- to plan an action for the robot based on the probability of obtaining the image; and
- to navigate, the robot, through the environment based on the planned action.

12. The apparatus of claim 11, in which the sensor comprises a stereoscopic camera.

13. The apparatus of claim 11, in which the at least one processor is further configured, for each potential cause of the plurality of potential causes:
- to calculate a likelihood of the measurement given the cause;
- to determine a probability of the potential cause in the grid-based stochastic map; and
- to combine measurement likelihoods for the plurality of potential causes and a probability of the plurality of potential causes:
  - to determine the probability of obtaining the measurement, and
  - to define the sensor model.

14. The apparatus of claim 11, in which the at least one processor is further configured to infer a presence of the intended target in the environment based on the determined probability of obtaining the image.

15. The apparatus of claim 11, in which the field of view is for one pixel of a plurality of pixels from an entire field of view of the sensor.

16. A non-transitory computer-readable medium having program code recorded thereon for defining a sensor model, the program code executed by a processor and comprising:
- program code to determine a probability of obtaining a measurement from a plurality of potential causes in a field of view of a sensor calculating a grid-based stochastic map of an environment, the grid-based stochastic map comprising a mean occupancy level for each voxel in the grid-based stochastic map and a variance of the mean occupancy level for each voxel, an occupancy level indicating whether a voxel is full, partially full, or empty, and each voxel corresponding to a cell in a grid of the grid-based stochastic map;
- program code to determine a probability of obtaining an image of an intended target of a robot at a current location of the robot based on the determined probability of obtaining the measurement;
- program code to update the mean occupancy level and the variance for voxels in the field of view based on the probability of obtaining the measurement;
- program code to plan an action for the robot based on the probability of obtaining the image; and
- program code to navigate, the robot, through the environment based on the planned action.

17. The non-transitory computer-readable medium of claim 16, in which the sensor comprises a stereoscopic camera.

18. The non-transitory computer-readable medium of claim 16, in which the program code further comprises, for each potential cause of the plurality of potential causes:
- program code to calculate a likelihood of the measurement given the cause;
- program code to determine a probability of the potential cause in the grid-based stochastic map; and
- program code to combine measurement likelihoods for the plurality of potential causes and a probability of the plurality of potential causes:
  - to determine the probability of obtaining the measurement, and
  - to define the sensor model.

19. The non-transitory computer-readable medium of claim 16, in which the program code further comprises program code to infer a presence of the intended target in the environment based on the determined probability of obtaining the image.

20. The non-transitory computer-readable medium of claim 16, in which the field of view is for one pixel of a plurality of pixels from an entire field of view of the sensor.

* * * * *